United States Patent [19]

Blanset et al.

[11] Patent Number: 4,747,040

[45] Date of Patent: May 24, 1988

[54] DUAL OPERATING SYSTEM COMPUTER

[75] Inventors: David R. Blanset, Middletown, N.J.; David A. Butterfield, Sylmar, Calif.; Kenneth M. Keverian, Westfield, N.J.; Charles S. Kline, Sherman Oaks; Gerald J. Popek, Los Angeles, both of Calif.

[73] Assignees: American Telephone & Telegraph Company, New York, N.Y.; AT&T Information Systems, Inc., Morristown, N.J.; Locus Computing Corporation, Santa Monica, Calif.

[21] Appl. No.: 785,842

[22] Filed: Oct. 9, 1985

[51] Int. Cl.[4] .............................................. G06F 9/38
[52] U.S. Cl. ................................................... 364/200
[58] Field of Search .......................... 364/200 MS File

[56] References Cited

U.S. PATENT DOCUMENTS

| | | | |
|---|---|---|---|
| 4,347,565 | 8/1982 | Kaneda et al. | 364/200 |
| 4,493,034 | 1/1985 | Angelle et al. | 364/200 |
| 4,530,052 | 7/1985 | King et al. | 364/200 |
| 4,591,975 | 5/1986 | Wade et al. | 364/200 |
| 4,597,044 | 6/1986 | Circello | 364/200 |

Primary Examiner—Thomas M. Heckler
Attorney, Agent, or Firm—Ronald D. Slusky

[57] ABSTRACT

The UNIX® and MS-DOS® operating systems are supported in a multi-tasking computer. At the heart of the computer is a microprocessor having protected and non-protected modes. The computer includes special-purpose hardware which prevents the MS-DOS system and its applications, which execute in the non-protected mode, from interfering with the UNIX system and its applications, which execute in the protected mode. In particular, this hardware monitors addresses generated by the computer and, by selectively inhibiting the associated control pulses, prevents the MS-DOS system from, for example, writing in UNIX-system-allocated memory, or accessing I/O devices that the UNIX system is currently using. In addition, a context switching feature is provided whereby the user can select, via a keyboard operation, to have displayed on the computer video monitor at any given time the image generated from the current UNIX system screen data or the image generated from the current MS-DOS system screen data.

4 Claims, 11 Drawing Sheets

DOSEXEC 514

INTERRUPTS DURING
PROTECTED MODE EXECUTION

INTERRUPTS DURING REAL MODE EXECUTION

INTERRUPT ASSIGNMENT TABLE

| I0 | I1 | | | | | | I7 |
|----|----|----|----|----|----|----|----|
| 1  | 0  | 0  | 0  | 0  | 0  | 1  | 1  |

1 = ASSIGNED TO MS_DOS SYSTEM
2 = ASSIGNED TO UNIX SYSTEM

DUAL OPERATING SYSTEM COMPUTER

BACKGROUND OF THE INVENTION

The present invention relates to computers capable of concurrently executing programs written for different operating system environments.

There is a need in the marketplace for a personal computer capable of executing computer programs written for different operating system environments. On the one hand, users may wish to avail themselves of, for example, such benefits of UNIX ® operating system as multi-tasking and various useful utilities. On the other hand, the vast bulk of the personal computer application software available today is written for the MS-DOS ® operating system.

Designing a computer capable of supporting two (or more) operating systems and executing their respective applications would not be particularly difficult if they are to operate in a single tasking environment. Both operating systems could be installed in memory and program control given to a particular one or the other of them depending on the software to be run. When the desire is to support two operating systems in a multi-tasking environment, however, the design problem can be significantly more complex—particularly, as will be seen, if one wants as a goal the ability to run the many software packages available for the IBM personal computer line, hereinafter referred to as the IBM-compatible software, which requires an MS-DOS system operating environment.

In particular, an important consideration in any multi-tasking system is to ensure that the various concurrently executing programs do not interfere with each other by, for example, attempting to write in the same memory space or to use the same peripheral device, such as a printer or disk drive, at the same time. To this end, microprocessors have been designed for use as the central processing units (CPUs) of personal computers wherein the microprocessor is provided with a so-called "protected mode" of operation. This mode provides a mechanism for, for example, allocating different areas of memory to the various concurrently executing programs and to otherwise prevent them from interfering with one another.

It thus might seem that a possible approach for allowing programs written for different operating systems or, indeed, programs of any type, to execute concurrently would be to simply run them all in a protected mode. As a practical matter, however, this solution may be unworkable. For example, the IBM-compatible software is written for an MS-DOS system environment as ported to an Intel microprocessor such as the 8086 or 8088. At a minimum, then, a multi-tasking computer that is to run that software should also be of the Intel family. The 80286, for example, is an Intel microprocessor which has a protected mode—indeed, it is currently the only Intel microprocessor having same—and could thus be used in such applications. Unfortunately, the so-called "segment" registers in the 80286 are defined differently when the microprocessor is operating in its protected mode from the way the segment registers are defined in the 8086 and 8088. As a result, software written for the 8086 or 8088, such as the IBM-compatible software, will not execute properly in the 80286 in protected mode. The 80286 does have a second operating mode, in which the operation of the 8086 and 8088 is emulated, that mode being referred to as the "real addressing mode" or, more simply, the "real mode." That mode, however, is a non-protected mode, and thus will not support a safe multi-tasking environment. Moreover, although it might seem possible to (a) run the IBM-compatible software in protected mode and (b) trap all segment register references and reload those registers with the appropriate values for protected mode operation, this may not be a practical solution because, for example, it would severely compromise performance and may be very difficult to implement for all cases.

In a similar vein, one might think of preprocessing any software written for real mode execution—hereinafter referred to as "real mode software'-'—to convert all segment register references to protected mode versions thereof. This is also not a practical solution because it would require being able to differentiate between programming and data in disassembled code—something that is not, in general, possible to do.

Moreover, running the real mode software in a separate processor, such as a separate 8086 or 8088, is not a wholly acceptable solution because unless one is willing to provide separate memories and peripherals for each of the processors, there remains a problem of how the various concurrently running programs are to share those resources.

A further problem to be taken into account is that, in order to speed up system response, much of the IBM-compatible software accesses the various computer peripherals not through established MS-DOS system calls but, rather, by (a) addressing the peripherals directly and/or (b) directly addressing the interface, referred to as Basic Input/Output System, or BIOS, between the MS-DOS operating system and the peripherals. Thus any approach that would simply prevent the MS-DOS operating system from accessing, on behalf of an executing application, memory and peripherals being used by other, concurrently executing applications would be an incomplete solution to the problem of how the IBM-compatible software could be executed in a multi-tasking environment, because the aforementioned programs will, unless prevented from doing so, access memory and peripherals on their own.

SUMMARY OF THE INVENTION

A computer embodying the principles of the present invention includes a processor having protected and non-protected modes of operation. A first operating system and its applications operate in the protected mode, while a second operating system and its applications execute in the non-protected mode. Software executing in the non-protected mode is prevented from interfering with software executing in the protected mode by providing a protection arrangement which operates prior to the initiation of the execution of the non-protected-mode software to identify addressable entities, such as memory locations and I/O ports, access to which during non-protected-mode execution is to be at least initially inhibited, and which thereafter operates when the non-protected-mode software is executing to inhibit such access if that software should attempt it.

In preferred embodiments, the processor is of the type which accesses an individual addressable entity during a so-called bus cycle by generating on an address bus during an initial portion of the bus cycle an address associated with that entity and which thereafter generates a control pulse on a control lead to actually effect the access. In accordance with a feature of the invention, the protection arrangement monitors the addresses appearing on the address bus. If during a particular bus cycle software executing in the non-protected mode generates on the address bus the address of one of the earlier-identified addressable entities, the control pulse generated in the latter portion of the bus cycle is inhibited and the attempted access itself is thereby inhibited.

In accordance with a further feature of the invention, attempted accesses to I/O ports that are inhibited as described above are trapped—that is, the instructions put out by the software in question are saved—and, under certain conditions, the instructions are reissued.

BRIEF DESCRIPTION OF THE DRAWINGS

The above, as well as other, features of the invention can be more fully appreciated from a consideration of the following detailed description and accompanying drawing in which.

DETAILED DESCRIPTION

Figure 1:
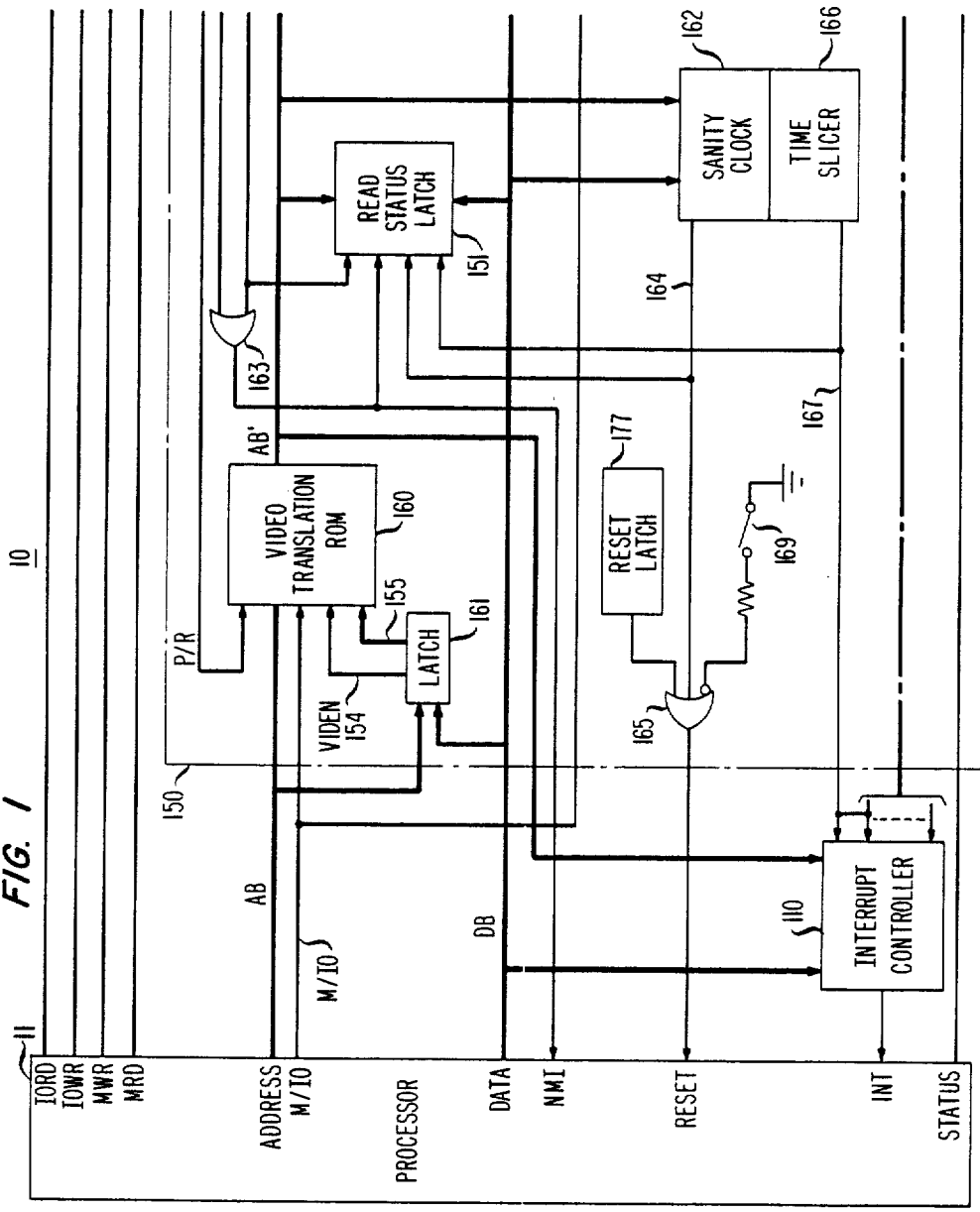
FIGS. 1-2, when arranged as shown in FIG. 3, comprise a simplified block diagram of a personal computer embodying the principles of the present invention.
Figure 2:
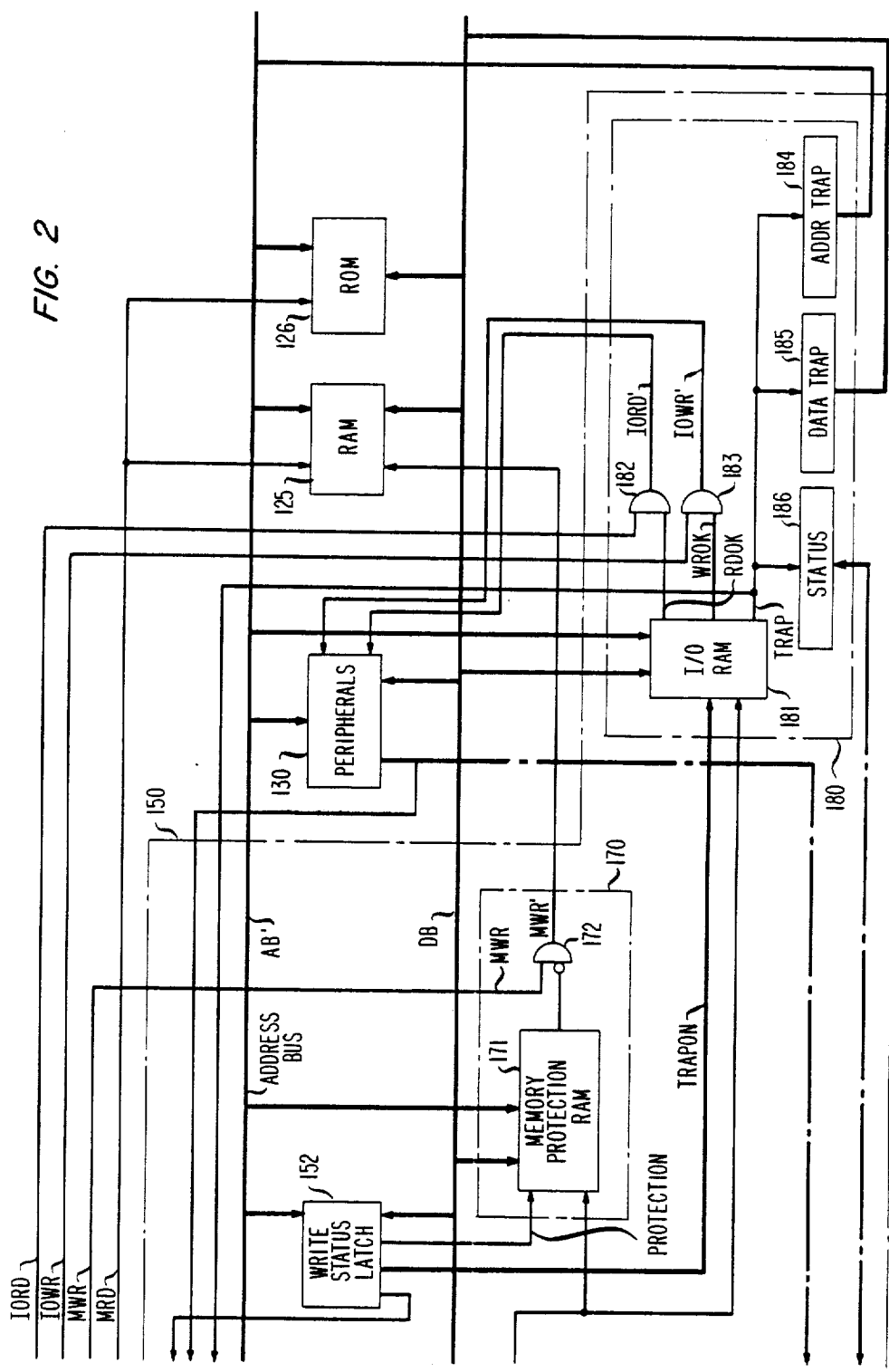

FIGS. 1 and 2, when arranged as shown in FIG. 3, depict a simplified block diagram of a personal computer 10. At the heart of the computer is a processor 11, which illustratively is an Intel 80286 microprocessor. Extending from processor 11 are an address bus AB, a data bus DB, and various control leads including memory read and write control leads MRD and MWR, respectively, and I/O read and write control leads IORD and IOWR, respectively.

Computer 10 further includes computer main (RAM) memory 125, ROM memory 126, various peripherals such as a keyboard, video controller, floppy and hard disk units, etc., denoted collectively as 130, and an interrupt controller 110. These are all connected in standard fashion to the address and data buses and various appropriate ones of the control leads. Also extending to various peripherals are chip select leads which, for clarity, are not explicitly shown in the drawing.

As also shown in the drawing, computer 10 further includes OS merge support hardware 150 embodying the principles of the present invention. This hardware will be described in detail as this description continues.

Processor 11 operates under the control of a first operating system—illustratively the UNIX ® operating system. The UNIX system supports multi-tasking, so that multiple programs written for execution in a UNIX system environment can be executing in computer 10 concurrently. Advantageously, computer 10 is also capable of executing programs written for a second operating system environment—illustratively that of the MS-DOS ® operating system. Indeed, the aforementioned multi-tasking capability extends to those programs as well, so that programs written for both environments can execute concurrently.

(The term "concurrently" executing is used herein to include typical time slice arrangements in which control of a single CPU is given over to the various active programs sequentially in round robin fashion in fraction-of-a-second "time slices." Thus although in reality only one of the so-called "concurrently" executing programs has program control, i.e., is actually having its code executed, at any given instant, the user's perception is that the programs are all executing at the same time.)

As noted hereinabove, a number of problems arise when one attempts to provide the dual-operating-system capability described above, at least with currently-available computer system components, and it is to the solutions of these problems that the present invention is directed. In order to see this in further detail, attention is directed to (a) FIGS. 4 and 5, which when arranged as shown in FIG. 6, comprise a map (not to scale) of the address space of computer 10, and (b) FIG. 7, which is a conceptual depiction of the operation of computer 10.

Figure 4:
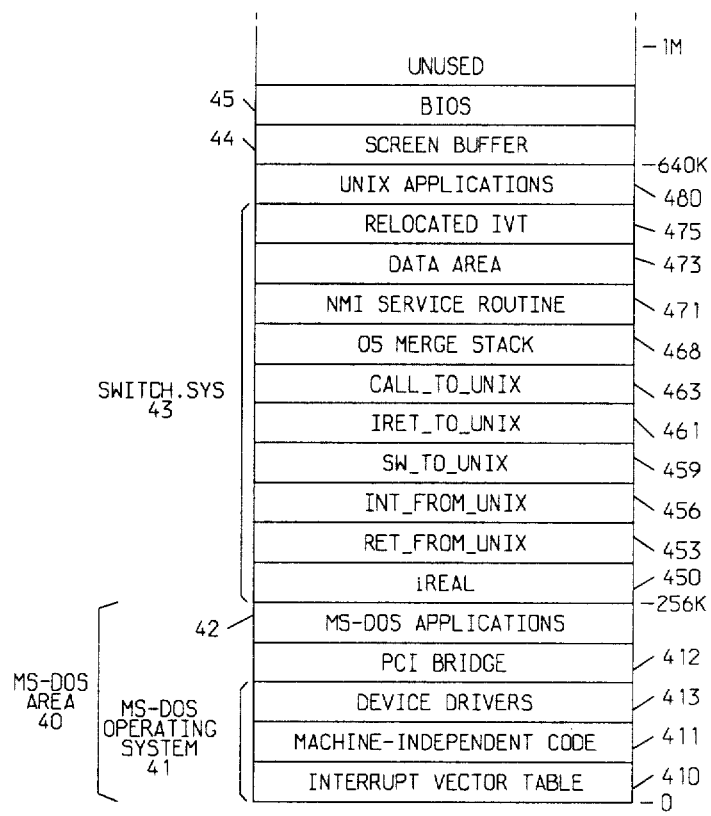
FIGS. 4-5, when arranged as shown in FIG. 6, comprise a map of the address space of the computer of FIGS. 1-2.
Figures 4, 5, 6:
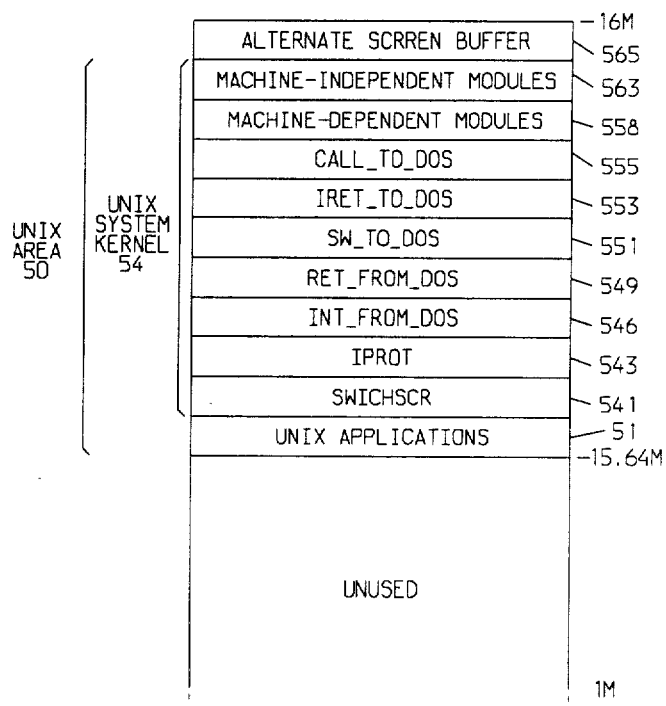

Turning first to FIGS. 4-5, the lowest 640K of addresses are allocated to RAM 125. This includes an MS-DOS area 40, which in turn comprises an area 41 for the MS-DOS system itself and an area 42 for its applications. The MS-DOS system, more particularly, includes its machine-independent code 411 and its device drivers 413. Also stored in area 40, at 412, is a body of code referred to as PCI bridge, which is discussed below. PCI 412 bridge is loaded into memory in the conventional manner for MS-DOS system device drivers. Area 40 extends upward from address 0 to an upper address dependent upon how much memory is requested by an MS-DOS application when it is started up. By default, the upper address is 256K, as indicated in FIG. 4.

Directly above MS-DOS application area is an area denoted switch.sys 43. This area includes a number of programs and data areas that are brought into play when control is switched between the two operating systems. The switch.sys programs are loaded into RAM 125 whenever an MS-DOS application is loaded.

Whatever is left of RAM 125, i.e., the area 480 between the top of the switch.sys area 43 and 640K, is available for UNIX applications.

Addresses beginning from 1M downward are allocated to ROM 126, in which is stored the so-called ROM BIOS discussed below. In addition, the addresses from 640K upward are allocated to a screen buffer memory located on the computer's video controller card. These two areas of memory are respectively denoted 45 and 44 in FIG. 4.

Addresses from 1M up to 15.64M are unallocated. Addresses from that point upward to 16M are again allocated to RAM 125. Within this part of the memory space is UNIX area 50, which comprises an area 54 for the UNIX system kernel and an area 51 for its applications. The kernel area, in turn, includes (a) an area 563 for UNIX system machine-independent modules, including, for example, the code that implements the UNIX file system, (b) an area 558 for UNIX system machine-dependent modules including, for example, device drivers and various machine support programs, and (c) areas having reference numerals between 541 and 555, in which are stored a number of individual programs and data areas that are used in cooperation with the programs and data stored in switch.sys area 43 to effect switches between the two operating systems. At the very top of this part of the memory space is an area 565 set aside as a so-called alternate screen buffer, discussed below.

At various points in the description that follows, the reference numerals shown in FIGS. 4–5 may be used to mean either a particular region of the address space, on the one hand, or the program or data stored in that space, on the other hand, as will be apparent from the context.

Figure 7:
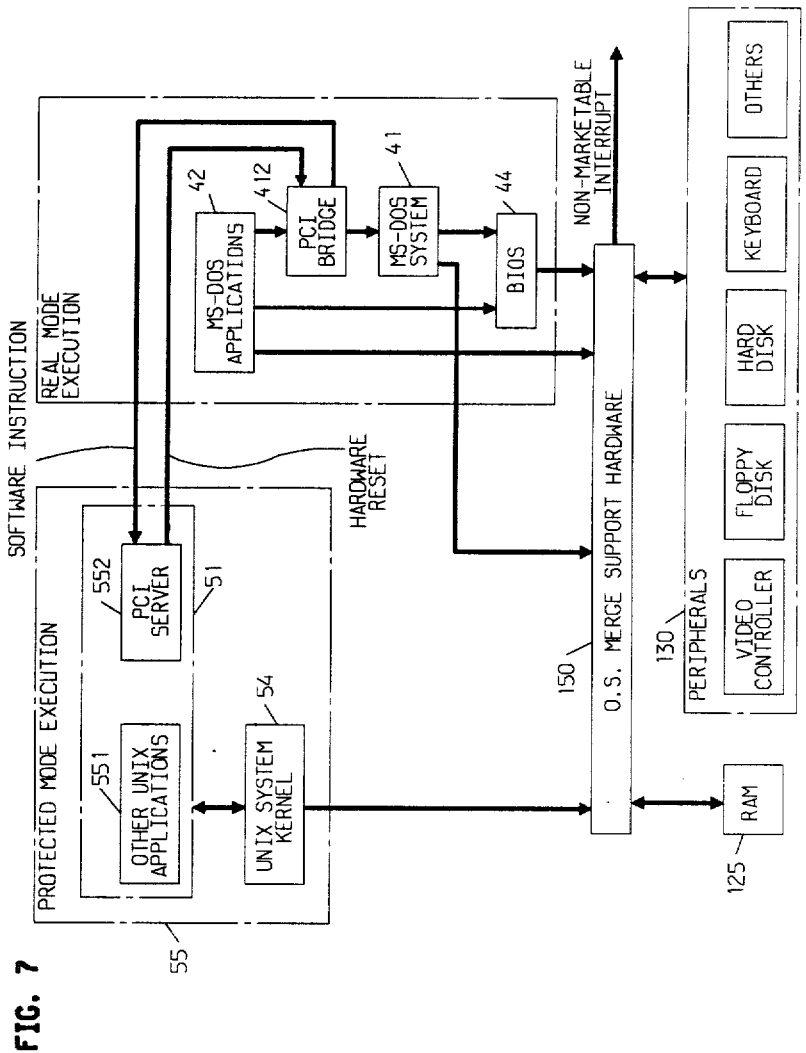
FIG. 7 is a conceptual depiction of the operation of computer 10.

Turning now to FIG. 7, UNIX applications are executed by the UNIX system 54 in the protected mode of the processor. When such applications require access to one of peripherals 130, a respective device driver within UNIX kernel 54 is invoked. The driver, in turn, accesses the peripheral in question, assuming that allowing access to the peripheral would not interfere with any other concurrently executing program. In addition, the kernel and the processor, in combination, enforce restrictions on access to RAM 125 as to prevent concurrently executing programs from, for example, writing in each others' memory space.

The MS-DOS operating system and its applications are executed in the so-called "real addressing mode'-'—hereinafter referred to as the "real mode"—of the 80286 processor. As is conventional, any calls by MS-DOS applications 42 to the MS-DOS system 41 that require the latter to, in turn, access a peripheral result in the MS-DOS system invoking an associated device driver. (For the present, it may be assumed that all system calls emanating from MS-DOS applications 42 pass directly through the block identified as PCI bridge 412 to the MS-DOS machine-independent code 411.) Some device drivers within the MS-DOS system embody the device driving code directly. For some peripherals, however, the device driver may comprise little more than a call to particular code in BIOS 45 which, as indicated above, is stored in ROM 126. BIOS 45 then directly accesses the peripheral in question on behalf of the operating system. In addition, as previously noted, the BIOS and/or peripherals are often directly accessed by the MS-DOS applications.

The MS-DOS operating system and its applications are executed in the real mode of the 80286 processor to take account of the segment register considerations discussed hereinabove. This is a non-protected mode of the 80286. Accordingly, processor 11 itself takes no action to prevent the MS-DOS system, its current application—the MS-DOS system being able to support only one application at a time—or its BIOS from accessing any peripheral or any area of RAM. Were nothing done, then, there is a good chance that at some point the MS-DOS system and/or its application will interfere with the UNIX system and/or ones of its applications that are then executing. For example, the MS-DOS system or its current application might attempt to access the same peripheral already being accessed by the UNIX system or to write in a region of RAM being used by the UNIX system. At best, such interference might be minor and momentary as, for example, if applications executing under the UNIX and MS-DOS systems each attempted for some period to write to the computer's screen buffer. At worst, it might cause one or both operating systems to crash.

In accordance with the present invention, however, all access to peripherals and to RAM is controlled by OS merge support hardware 150, thereby precluding the above from happening. In particular, as shown in FIG. 1, OS merge support hardware 150 includes memory protection circuitry 170 and I/O trap and protection circuitry 180 as two of its three principal elements. Hardware 150 also includes video translation ROM 160 at which address bus AB terminates. The output of ROM 160 is an address bus AB'. For the moment it may be assumed that all addresses on bus AB simply pass through ROM 160 and appear on bus AB'.

In accordance with the invention, circuitries 170 and 180 monitor the addresses on bus AB'. If, during a particular bus cycle, software executing in real mode attempts to access an addressable entity, e.g., an area of RAM or an I/O port, that the UNIX system has predetermined that that software should not get access to—at least not immediately—circuitry 170 or 180 inhibits the immediately following control pulse of that bus cycle that would otherwise cause the undesired memory or I/O access, respectively, to be carried out.

More specifically, attention is first directed to memory protection circuitry 170. When the UNIX system starts up a new process, it allocates a portion of memory to that process. Since the UNIX system executes in protected mode, any processes that may be executing under the UNIX system are prevented by the operating system and the processor, in combination, from writing in each others' allocated memory space. Since the MS-DOS system executes in real mode, however, nothing in the processor itself prevents the MS-DOS operating system or its applications from writing at any location within the MS-DOS system addressing range, which to 0 to 1M, and therefore writing, for example, in switch sys area 43 or in UNIX application area 480. This function is, however, provided by memory protection circuitry 170.

Specifically, memory protection circuitry 170 includes a 1K×1 bit memory protection RAM 171, with each bit in RAM 171 corresponding to a respective 1K piece of memory in RAM 125. (Although not explicitly shown in the drawing, RAM 171 should be understood to include some straightforward logic circuitry that, for example, responds to its input control signals, as described below. This is also the case for ROM 160 and RAM 181, also described (below.) Memory protection circuitry 170 (also includes a two-input AND gate 172, whose inputs are (a) the computer 10 memory write control lead MWR and (b) the negated output of memory protection RAM 171. It is the output lead MWR' of gate 172, rather than lead MWR, that serves as the memory write control lead of the computer. As discussed more fully below, whenever a new MS-DOS application is started up, the bits in memory protection RAM 171 are set so as to indicate which areas of RAM 125 can be written by the application software executing in real mode.

In operation, then, if application software executing in real mode attempts, during the initial stage of a bus cycle, to address memory for which it does not have write access, the output of memory 171 goes high. (A memory address is distinguished from an I/O port address by virtue of a bit generated by processor 11 on lead M/IO that extends to RAM 171.) This prevents lead MWR' from going high during the latter stage of the bus cycle, thereby preventing the attempted memory write. Otherwise, the output of memory 171 remains low and the pulse of lead MWR passes through to lead MWR'.

Attention is now directed to I/O trap and protection circuitry 180. In standard UNIX system protected mode operation, in order for a process to get access to a peripheral device, it must first execute an "open" command. Assume, for example, that no other process is using the device. In that case UNIX system may grant access to the device and, at the same time, record in a table the fact that that device is currently open for the process. Assume, further, that the UNIX system has granted exclusive use of the device to the process. If another process thereafter attempts to access the same device via an "open" before the first process executes a "close" command, that access will be denied. It is through this mechanism that the UNIX system prevents various processes concurrently executing in protected mode from interfering with one another. Again, however, since the MS-DOS system executes in real mode, nothing in the processor itself prevents the MS-DOS operating system or its applications from accessing an I/O device currently being used by software executing in protected mode. This function is, however, provided by I/O trap and protection circuitry 180.

Specifically, I/O trap and protection circuitry 180 includes a 4K×4 I/O RAM 181, with each 4-bit word in that RAM corresponding to an addressable I/O port. (A particular peripheral device typically has more than one addressable port and, indeed, may have many.) The value of the first bit of each word in RAM 181 indicates whether an attempted accessing of the associated port is to be trapped or not, the nature of that trapping being discussed momentarily. The value of the second (third) bit indicates whether read (write) access to the I/O port in question is to be inhibited. Illustratively, the fourth bit of each word is unused.

Whenever the address of an I/O port appears on bus AB' during the initial portion of the bus cycle, RAM 181 puts out the aforementioned first, second and third bits of the word associated with that port, those bits appearing on leads TRAP, RDOK (read OK) and WROK (write OK), respectively. (Again, an I/O address is distinguished from a memory address by virtue of the bit on lead M/IO.)

Lead RDOK, in particular, extends to one input of AND gate 182. The other input for AND gate 182 is taken from the computer I/O read control lead IORD. If read access for the port in question is permitted, lead RDOK is high when the port is addressed. The subsequent pulse on lead IORD during the latter portion of the bus cycle thus passes through gate 182 to its output lead IORD', which extends, for example, to peripherals 130 and, in general, serves as the actual I/O read control lead for the rest of the computer. Otherwise, that pulse is inhibited and the port is not read.

Similarly, lead WROK extends to one input of an AND gate 183, while the other input for AND gate 183 is taken from the computer I/O write control lead IOWR. If write access for the port in question is permitted, lead WROK is high when the port is addressed. The subsequent pulse on lead IOWR thus passes through gate 183 to its output lead IOWR', which extends, for example, to peripherals 130 and, in general, serves as the actual I/O write control lead for the rest of the computer. Otherwise, that pulse is inhibited and the port is not written to.

Lead TRAP extends to the non-maskable interrupt (NMI) input of processor 11 via the output lead of OR gate 163. When that lead goes high, it sets an associated bit in a read status latch 151. Lead TRAP also extends to, and when it goes high, provides a gating signal for, address trap 184, data trap 185 and status trap 186, which are respective FIFO registers within circuitry 180. It also sets an associated bit in latch 151 at this time.

When gated, traps 184 and 185 begin to read in the addresses and data then and thereafter appearing on buses AB' and DB, respectively, until such time as the NMI is responded to by the processor. Concurrent with trapping the addresses and data, status trap 184 reads in status information provided by processor 11 indicating, for example, whether the current instruction is a word I/O instruction or a byte I/O instruction. In sum, then, circuitry 180 takes in, or "traps", exactly what it is that the real mode software was attempting to do up to the point at which the processor responded to the NMI and ceased to execute that software.

Figure 17:
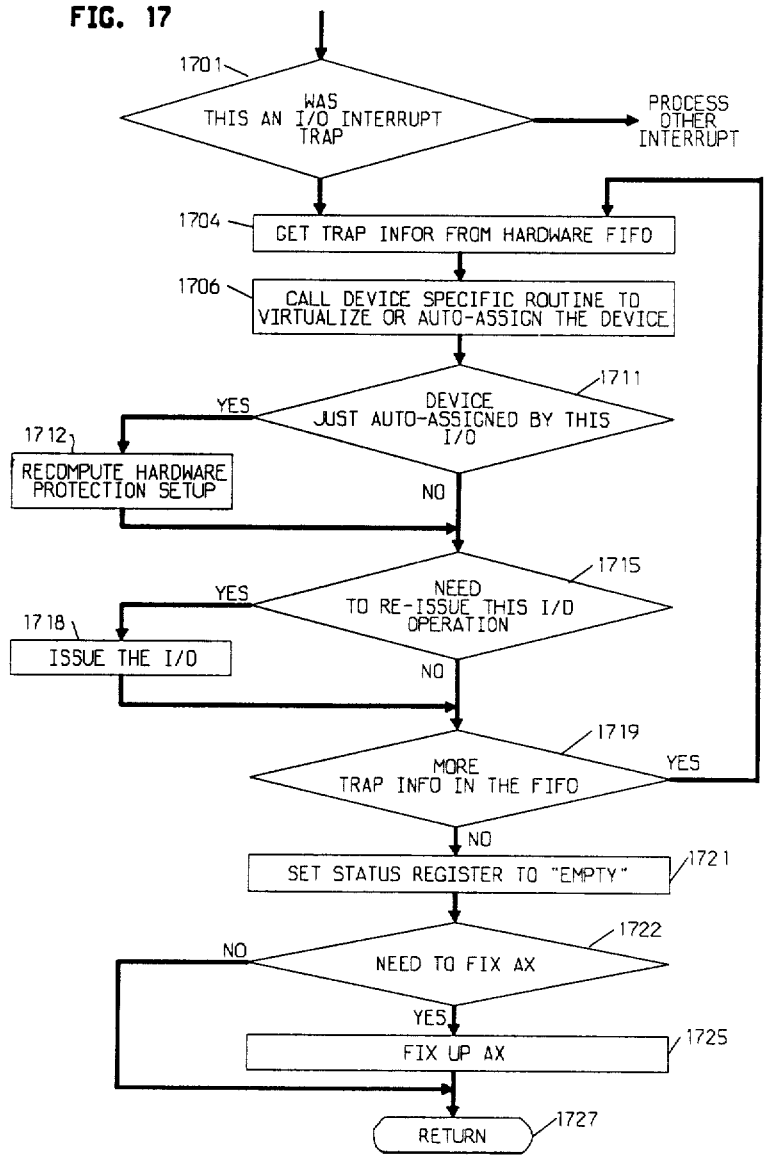

The NMI service routine, or handler, is located in switch.sys area 43, where it is denoted at 471. This routine examines the aforementioned bits stored in latch 151 to determine if the NMI was an I/O trap NMI, i.e., whether it was set off by circuitry 180 or from somewhere else in the computer, such as one of the peripherals 130. If the NMI was, in fact, set off by circuitry 180, that routine thereupon decides what to do with the trapped information. It can, for example, simply throw it away. Alternatively, it can reissue the instruction that was trapped while, perhaps, performing various housekeeping functions. A block diagram of this routine is shown in FIG. 17 and is discussed hereinbelow. For the present, however, an example will demonstrate how the present trapping mechanism operates.

In particular, whenever a new MS-DOS application is started up, but while the UNIX system is still in control in protected mode, sw_to_dos 551 routine (described below) initializes RAM 181. In particular, it sets the first bit in each of the words in RAM 181 to a "1", indicating that an attempted access to any I/O port is to be trapped. At the same time, it sets the second and third bits in a way that is dependent on the nature of the I/O port in question. For a few types of I/O devices, reading a port thereof will change its state. Therefore, the second bit stored in RAM 121 for any such port is set to "0", indicating that it cannot be read. The second bit for each other port is, however, set to "1", indicating that that port can be read. In addition, the third bit for each port is set to "0", indicating that that port cannot be written to.

In operation, then, the first time software executing in real mode attempts to access a particular I/O port, such as the floppy disk motor, the TRAP output of RAM 181 goes high, thereby generating an NMI. The NMI service routine thereupon consults the aforementioned table maintained by the UNIX system. If that table indicates that some protected mode process has already opened the floppy disk, to continue with that example, nothing further is done. Therefore, only such access as was indicated allowable by the second and third bits of the associated word in RAM 121 will have been permitted to occur. The trapped information is ignored and execution resumes.

If, on the other hand, the floppy disk drive is not open, the NMI routine will take a number of further steps. For example, it will in fact open that device on behalf of the MS-DOS system. It will also cause RAM 181 to be updated to set the first bit in the word stored for all floppy disk ports to "0" and the second and third bits to "1". In addition, if I/O trap and protection circuitry 180 prevented the attempted access, the NMI interrupt routine will use the addressing information and data stored in traps 184, 185 and 186 to reissue that access.

From this point on, until the real mode process terminates, or until a special command available in the UNIX system is issued, the floppy disk is uniquely associated with the MS-DOS system. Moreover, as a result of the updating of RAM 181, no further trapping or control pulse inhibiting occurs when ports associated with that device are addressed.

Certain devices—including, for example, the keyboard, video controller, and interrupt controller—are shared by the UNIX and MS-DOS systems and, as described in detail in conjunction with FIG. 17, attempted accesses thereto are always trapped.

Another part of OS merge support hardware 150, as mentioned above, is video translation ROM 160, whose function will now be explained.

It will often be the case that two or more programs executing concurrently in computer 10 will be concurrently generating screen data, i.e., data destined for the screen buffer from which it is converted into a video signal for the video monitor by the video controller. To the extent that those programs are, for example, UNIX applications executing under the UNIX system in protected mode, the UNIX system can control in a well-defined way which of their screen data are actually sent to the screen buffer. Obviously, however, the UNIX system has no such control over programs executing in real mode under the MS-DOS system.

In order to deal with this situation, computer 10 provides a context switching mechanism whereby the user can choose, via a keyboard operation, to have displayed on the video monitor at any given time the image generated from the current UNIX system screen data, hereinafter referred to as the UNIX system screen, or the image generated from the current MS-DOS system screen data, hereinafter referred to as the MS-DOS system screen. When the UNIX (MS-DOS) system screen is selected, its data is stored in screen buffer 44 so that it will in fact be displayed on the monitor. At the same time, any screen data from the MS-DOS (UNIX) system is stored in RAM in alternate screen buffer 565. When the user requests a context switch in order to view the MS-DOS (UNIX) system screen, the contents of the screen buffer and alternate buffer are exchanged and subsequent screen data output from the UNIX (MS-DOS) and MS-DOS (UNIX) systems is directed to alternate screen buffer 565 and screen buffer 44, respectively.

The mechanism provided in computer 10 for sending UNIX system screen data to the desired one of screen buffer 44 and alternate screen buffer 565 takes advantage of the virtual addressing capability available in the 80286 microprocessor when it is in protected mode. In particular, the addresses generated by the UNIX system are always virtual addresses which the processor converts to physical addresses in accordance with entries in a so-called global descriptor table. Thus, for example, an entry in the global descriptor table points to the starting point of the physical address space where screen data is to be stored. Thus, directing UNIX system screen data alternatively to screen buffer 44 and alternate screen buffer 565 simply involves changing the relevant global descriptor table entry between two values.

Unfortunately, this mechanism cannot be used to direct the MS-DOS system screen data because, for example, the above-described virtual addressing capability is not available in real mode. It is for this reason that video translation ROM 160 is provided. ROM 160 is interposed between bus AB and the various addressable entities within the computer. The latter is so programmed that addresses outside of the range of addresses encompassed by screen buffer 44 pass through to address bus AB' unchanged. On the other hand, when ROM 160 is enabled, the three highest-order bits of addresses that are within that range are incremented by a value specified by processor 11 via three of the bits stored in a 4-bit latch 161 provided on leads 155, that value being such that addresses of locations in screen buffer 44 are converted to addresses in alternate screen buffer 565. (Again, a memory address is distinguished from an I/O port address by virtue of the bit on lead M/IO.)

In operation, then, ROM 160 is enabled whenever (a) the computer is in real mode and (b) the user has selected the UNIX system screen to be displayed. ROM 160 must, however, be disabled at least whenever both (a) the computer is in protected mode and (b) the user has selected the UNIX system screen to be displayed. If ROM 160 were not disabled at that time, the UNIX system screen data would be sent to alternate screen buffer 565 instead of screen buffer 44. Of course, even if the user has selected the MS-DOS system screen to be displayed, there is no harm in having ROM 160 disabled during protected mode execution since the MS-DOS system is not actually executing and therefore is generating no screen data. In order to provide the above-discussed functionality, a bit stored in a write status latch 152 indicating whether the processor is in protected or real mode is provided to ROM 160 on lead P/R. The fourth bit in latch 161, which is extended to ROM 160 via lead 154, is controlled by processor 11 to enable or disable ROM 160 during real mode, as required.

Figures 16, 18:
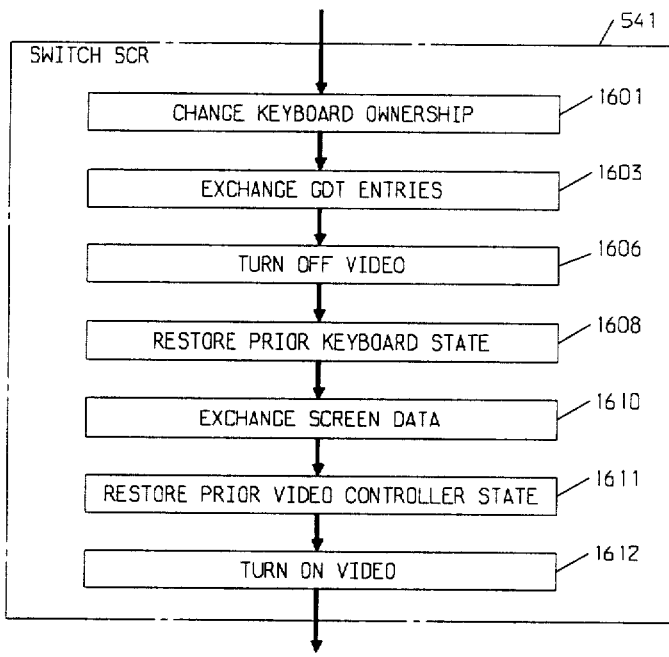
FIG. 18 shows an interrupt assignment table maintained within the computer.

The flowchart of FIG. 16 shows the above-described context switching operation in more detail. A description of same is provided hereinafter at a more opportune point.

Also included within OS merge support hardware 150 are sanity clock 162 and time slicer 166, which are illustratively on the same integrated circuit chip. Time slicer 166 is a standard UNIX system element which interrupts processor 11 sixty times per second by generating pulses at that rate on lead 167, the latter extending to interrupt controller 110. The principal function of the interrupt service routine that is invoked in response to these interrupts is to allocate processor time among the various concurrently executing processes. Therefore, if processor 11 is somehow precluded from responding to the interrupts requested on lead 167, the processor could get "hung up" indefinitely in a particular process. This might happen, for example, if an MS-DOS application were to instruct the processor to ignore its interrupts (which the processor permits when operating in real mode) and then enter some pathological state, such as getting stuck in a loop. In that event, the interrupts requested on lead 167 would never be responded to and everything would grind to a halt.

It is to ensure that this does not in fact happen that sanity clock 162 is provided. In particular, sanity clock 162 is a timer that, illustratively, times out two seconds after it is reset. In the normal course of events, it is in fact reset every 1/60$^{th}$ of a second by the aforesaid interrupt service routine. Thus as long as the interrupt requests on lead 167 get through to the processor, sanity clock 162 is prevented from ever timing out. If, however, no such interrupt occurs within a two-second period, it does time out and, in so doing, generates a pulse on lead 164. This pulse is extended through OR gate 165 to the reset pin of processor 11, thereby causing the processor to reset itself to, for example, execute clean-up code, terminate the MS-DOS process and continue normal UNIX system execution. (A manual reset via a switch 169, which will cause the computer to reboot, is also possible.) The fact that the sanity timer went off is also recorded via an associated bit stored in latch 151.

Figure 8:
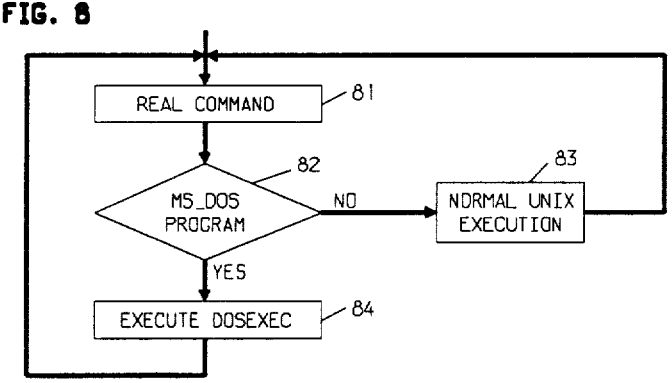
FIGS. 8-17 are flowcharts depicting various aspects of the operation of the computer of FIGS. 1-2.

FIG. 8 provides a broad overview as to how the concurrent execution of programs designed for UNIX and MS-DOS system execution is carried out. It is assumed that at this point the UNIX system has already been booted up and loaded into memory as shown in FIG. 5. At block 81, in particular, the UNIX system command interpreter, or "shell," reads a command, i.e., the name of a program to be executed, from the command line. The command can be either (a) a UNIX system command, such as the standard utility commands "cat", "nroff", or a particular application written for execution in a UNIX system environment, or (b) an MS-DOS system command, such as the standard commands "dir" and "copy" or a particular application written for execution in an MS-DOS system environment. Upon locating the program in memory, the computer proceeds to determine, at block 82, which operating system the program was designed to run under. Among the ways this is illustratively accomplished is for the computer to look at the program code itself for any so-called "magic numbers" which indicate which kind of program was invoked.

If the program is identified as one that is to run in a UNIX system environment, the computer simply proceeds to execute that program in the standard way, as indicated at block 83. If, on the other hand, the program is identified as one that is to run in an MS-DOS system environment, a UNIX application, dosexec (DOS execution) 514, is executed, as indicated at block 84. From the UNIX system's viewpoint, dosexec is just another program running in the UNIX system environment in area 480 or area 51. However, it is within the context of dosexec that execution of programs designed to run in an MS-DOS operating system environment is initiated, as is discussed in detail hereinbelow. Computer 10 returns to block 81, ready to read another command, once the program execution in block 83 or block 84, as appropriate, terminates or, if the user has invoked the program in the "background," once execution in block 83 or block 84, has been initiated.

Figure 9:
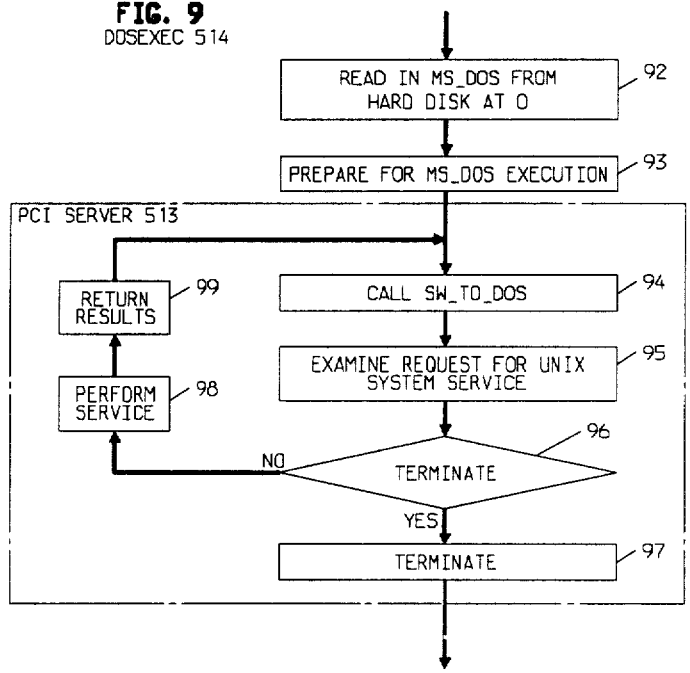

A flowchart of the aforementioned dosexec program 514 is shown in FIG. 9. As indicated at 92, the program first reads in the MS-DOS operating system from hard disk and stores it in RAM beginning at address 0. As indicated at block 93, a number of steps are then taken to prepare for MS-DOS execution. For example, the switch.sys programs are loaded into area 45. In addition, various parameters for OS merge support hardware 150 are defined including, for example, the contents of protection memories 171 and 181. Moreover, a state is then "set up", or defined, for the MS-DOS system. This state is such that when execution of the MS-DOS system is later initiated from that state, (a) the operating system will be executing as though it had already been up and running and (b) the command entered at block 81 (FIG. 8) will be executed.

At this point, the dosexec program—using the UNIX system "exec" mechanism—calls into its process a UNIX application referred to as PC Interface server—hereinafter PCI server—513. As described in further detail hereinafter, PCI server 513 functions as an interface, or gateway, to and from execution in the real mode. PCI server 513, in turn, calls a program, resident in the UNIX system kernel, referred to as sw_to_dos 551 (switch to DOS). This routine is discussed in detail hereinbelow. For the moment, however, it suffices to indicate that the principal functions of sw_to_dos 551 are to save the current, protected mode state of the computer and to cause a transfer to real mode execution. Execution of PCI server 513 is thereby suspended.

In order to see how and when execution of PCI server 513 resumes, it is useful to direct attention back to the real mode execution depicted in FIG. 7. Specifically, in order to ensure that, for example, files created by the MS-DOS system and stored on the hard disk can be accessed by the UNIX system and vice versa, all hard disk files, those created both by the UNIX system and its applications and by the MS-DOS system and its applications, are maintained in a single file structure administered by the UNIX system. A mechanism must thus be provided to enable the MS-DOS system to create and/or access that file system. PCI bridge 412 and the aforementioned PCI server 513 provide that mechanism. In particular, although most system calls emanating from MS-DOS applications 42 pass directly through PCI bridge 412 to the MS-DOS kernel, as previously noted, system calls that require service from the UNIX system, including, for example, calls that involve access to the hard disk file system and requests for process termination, are intercepted by bridge 412 which thereupon converts them to a particular, non-operating-system-specific form, stores them in area 473 and then calls a routine in the switch.sys area 43 referred to as sw_to_unix 459. The routine sw_to_unix 459 is the counterpart to the above-discussed sw_to_dos 551 routine and is discussed in detail hereinbelow. For the moment, it suffices to indicate that its principal functions at this time are to save the then current, real mode state of the computer and to cause execution to return to protected mode. It is in this way that execution resumes, in protected mode, within the sw_to_dos 551 routine at block 94 in FIG. 9.

Upon resuming its execution, sw_to_dos simply exits. Control thus returns to its calling program, PCI server 513. The latter takes the above-discussed converted MS-DOS system call from area 473, converts it into an equivalent UNIX system call and, as indicated at 95, examines it. If, as determined at block 96, the request is a request for other than termination of the process, PCI server 513, interacting to the extent necessary with the UNIX system, performs the requested service, as indicated at block 98. As indicated at 99, PCI server 513 puts the results of the request into area 473 where they can be accessed by the PCI bridge, and then again calls sw_to_dos. Once the real mode state previously saved by the sw_to_unix routine is restored, execution of the MS-DOS application resumes where it left off. This process repeats until the MS-DOS application requests process termination. At that point, the execution of PCI server 513 falls through to block 97, at which point the process is terminated. Return is thus made back to block 81 (FIG. 8).

Figure 10:
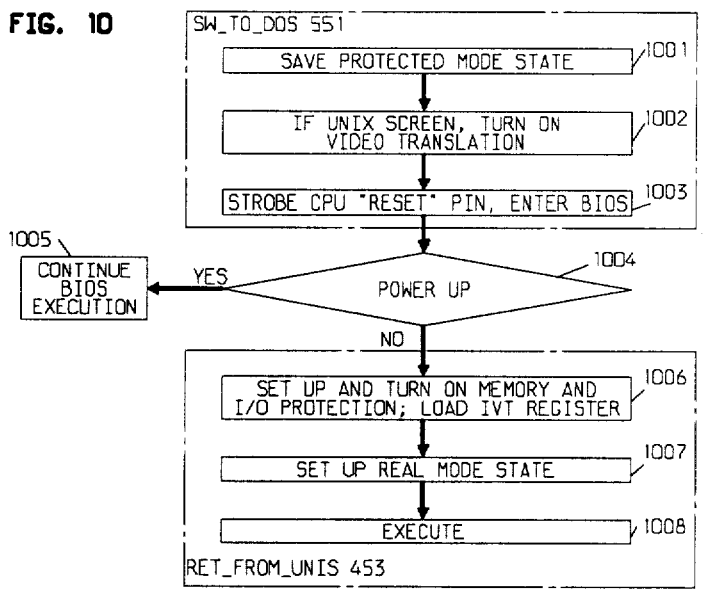

FIG. 10 shows in more detail how computer 10 is switched from protected mode to real mode in the above context. As noted above, this procedure begins with a call to sw_to_dos 551. Specifically, that program begins at block 1001 by saving the current, protected mode state of the computer. It does this by storing in a predefined area within the kernel, and on the current stack, all current register values, the stack pointer value, etc. In addition, at block 1002 if video translation ROM 160 is to be turned on at this time, as discussed above, a bit in latch 152 is set, that bit controlling lead VIDEN extending to the ROM. Moreover, although not shown explicitly in the drawing, sw—to—dos writes information into a data area 473 within switch.sys area 43 pointing to a counterpart program in that area, ret—from—unix 453, that is to be executed once a switch to real mode has been made.

At block 1003, the reset pin of processor 11 is strobed by setting a reset latch 177 via an associated chip select lead (not shown). This causes the processor to enter its real mode. Indeed, it is the only way to cause this particular processor to enter its real mode. Resetting the processor automatically causes it to begin executing at a particular location in ROM in the region occupied by BIOS 45. Execution also begins at this location whenever the processor is powered up. In computer 10, BIOS 45 is provided with program code at this location that first examines via data bus DB a power-up flag stored in a read status latch 151 that is reset when the processor is, in fact, powered up. If that power-up flag is not set, as determined at decision block 1004, execution continues with certain diagnostic routines in the BIOS as indicated at 1005 and ultimately a jump is made to a UNIX system bootstrap routine, which thereupon boots up the UNIX system and sets the power-up flag. If the power-up flag is already set, as is the case in the present scenario, code in the BIOS jumps to a routine within switch.sys area 43 referred to as ret—from—unix (return from UNIX) 453, as indicated at block 1006.

Specifically, at block 1006 of ret—from—unix 453, the parameters defined at block 1002 are actually loaded into OS merge support hardware 150. Memory protection circuitry 170 and I/O trap and protection circuitry 180 are turned on by setting respective bits in a write status latch 152, one of which controls lead PROTECTON extending to circuitry 170 and another of which controls lead TRAPON extending to circuitry 180. The real mode state at which the computer is to begin executing is then restored at block 1007—that state being either the one defined at block 93 or the state saved when real mode execution was last suspended—and real mode execution proceeds from that point, as indicated at block 1008.

Figure 11:
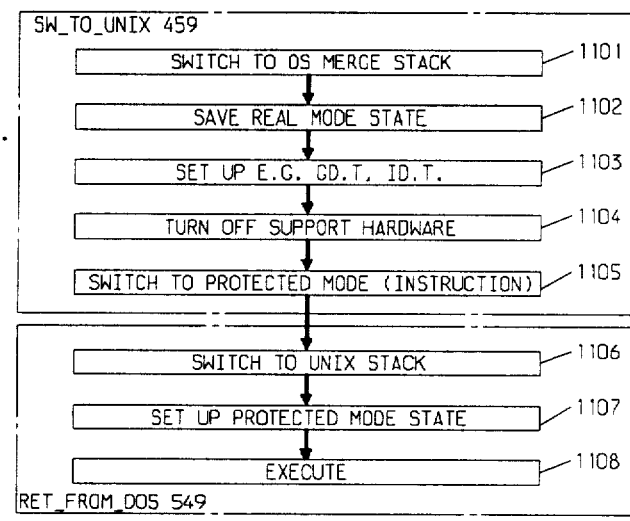

FIG. 11 shows in more detail how computer 10 is switched from real mode to protected mode. As noted above, this procedure begins with a call to sw—to—unix 459. Specifically, that program begins at block 1101 by switching from the current stack to an OS merge stack 468 within switch.sys area 43. As indicated at block 1102, the current real mode state is then saved on that stack. The reason that the real mode state is not simply saved on the stack that was in use during real mode execution is that real mode software executing as the result of, for example, the occurrence of a nested interrupt might change that state in such a way as to, for example, cause erroneous execution of, for example, some code in area 45. As noted above, the entirety of switch.sys area 43 is write-protected during MS-DOS execution so that the saved state cannot, in fact, be changed.

Certain elements of the protected mode state must be set up before the switch to protected mode is actually made. This includes the contents of certain special purpose registers, such as the so-called GDT and IDT registers, which are therefore now set up at block 1103.

As discussed earlier, the UNIX system continuously keeps track of (a) which I/O devices are at any given time assigned to itself and to the MS-DOS system, and (b) which areas of RAM have been allocated to the UNIX and MS-DOS systems. Moreover, the UNIX system is "well-behaved", i.e., it will not access an I/O port or area of memory that it is not supposed to. Therefore neither memory protection circuitry 110 nor I/O trap and protection circuitry 120 is needed to be in operation when the computer is in protected mode. Accordingly, as indicated at 1004, these elements of OS merge support hardware 150 are now turned off. Video translation ROM 160 is also now turned off, as described above.

Moreover, although not shown explicitly in the drawing, sw—to unix, in addition, writes information into data area 473 within switch.sys area 43 pointing to a counterpart program in that area, ret—from—dos 549, that is to be executed once a switch to protected mode has been made.

At block 1105, the CPU is switched back to protected mode via an instruction provided as part of the 80286 instruction set.

At block 1106, a switch is made to the stack that was being used in the UNIX system when the switch to real mode was made. As indicated at 1107, that stack is then set up with either the state that was saved by sw—to—. dos 551 at block 1001 (FIG. 10) or a state that was defined during interrupt processing, as described below.

Figure 12:
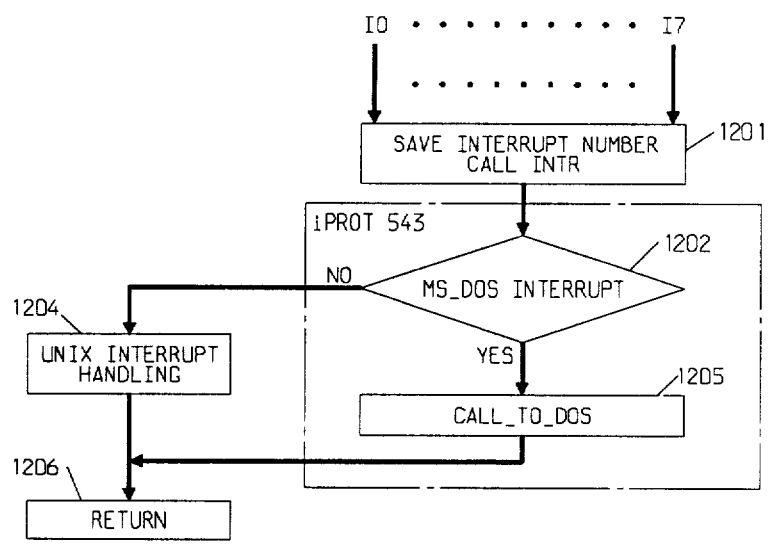

FIG. 12 depicts how computer 10 deals with interrupts while it is executing in protected mode. Interrupts are of two types: hardware interrupts and software interrupts. There are eight different hardware interrupts, I0 to I7, which are generated by respective hardware peripherals to interrupt controller 110.

In particular, the computer's timer generates I0; the keyboard and time slicer generate I1; and the communications controller, hard disk unit, floppy disk unit and printer generate I4, I5, I6 and I7, respectively. (The computer distinguishes between keyboard- and time slicer-generated I1 interrupts by checking the value of a bit that is set in latch 151 whenever the time slicer output is pulsed and that bit is reset by the corresponding interrupt service routine.) Interrupts I2 and I3 are reserved for special-purpose plug-in cards that the user might purchase separate from the computer and install therein.

Software interrupt instructions are usually only used during MS-DOS system execution. Obviously, however, hardware interrupts are used by both. Thus, we have recognized that, whenever a hardware interrupt occurs, it must be known whether the UNIX system had opened the device that originated the interrupt for itself or for the MS-DOS system because this determines which operating system's interrupt service routine is to be invoked. To this end, in accordance with a feature of the invention, an interrupt assignment table, shown in FIG. 18, is maintained in data area 473 within switch.sys area 45 as well as in the UNIX system kernel. That table stores eight bits—one for each of the interrupts I0 to I7. Whenever the UNIX system opens a device for the UNIX (MS-DOS) system, it also sets to "0" ("1") in the interrupt assignment table the bit assigned to the interrupt generated by the device in question, an illustrative assignment of interrupts between the two operating systems being shown in FIG. 18. The interrupt is then said to be "owned" by the UNIX (MS-DOS) system. In accordance with a further feature of the invention, processor 11 is switched to the real (protected) mode whenever an interrupt owned by the MS-DOS (UNIX) system goes off while the processor is in protected (real) mode.

Specifically, when a particular hardware interrupt occurs during protected mode execution, the computer, operating in conjunction with its interrupt controller in conventional fashion, transfers control to an associated routine in the UNIX system's interrupt descriptor table (IDT) within the UNIX system kernel. In computer 10, that routine comprises two instructions. As indicated at block 1201, the first instruction is to save away the interrupt number. The second is to call a routine in the UNIX system kernel referred to as "intr" which, in turn, calls a routine iprot 543 stored in the kernel. In accordance with a feature of the invention, the latter determines, at block 1202, whether the interrupt is owned by the MS-DOS system. If it is not, iprot 543 exits and control returns to intr. The latter, in turn, causes control to pass within the kernel, in conventional fashion, to the UNIX system interrupt service routine for the interrupt in question, as indicated at block 1204. A return routine is then invoked, as indicated at block 1206, and execution resumes at the point at which the computer was interrupted.

If, on the other hand, the MS-DOS system does own the interrupt, then, in accordance with this feature of the invention, the computer must be switched to real mode so that the associated MS-DOS system interrupt handler can execute properly. To this end, iprot proceeds to block 1205, at which it calls a routine call_to_dos 555. The call_to_dos routine is very similar to sw_to_dos 551 except that the information that it writes into data area 473 points not to ret_from_unix 453 but to a different routine in area 43—int_from_unix 456.

Figure 13:
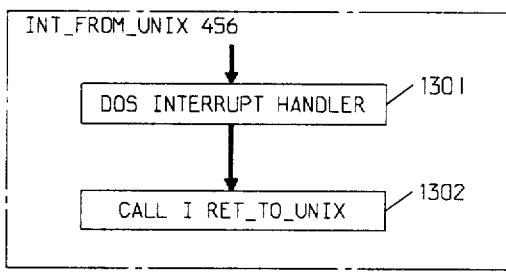

The routine int_from_unix, in turn, is shown in FIG. 13. That routine has essentially two functions. As indicated at 1301, it first passes control to the MS-DOS system interrupt handler associated with the interrupt number in question. It then calls a routine iret_to_unix 461, as indicated at 1302, so as to return the computer to the protected mode execution that was in progress when the interrupt went off. The routine iret_to_unix 461 is, for practical purposes, identical to sw_to_unix 459. Execution thus resumes at the very end of call_to_dos 555 at block 1205 and immediately falls through, as before, to the return routine indicated at block 1206.

A goal in the design of an actual embodiment of computer 10 was to use the standard version of the MS-DOS operating system as licensed by the vendor, Microsoft Corporation. Accordingly, a mechanism outside of the MS-DOS system was needed to cause processor 11 to switch from real mode into protected mode when an interrupt owned by the UNIX system goes off, so that the appropriate UNIX system interrupt handler can be executed. Otherwise, the MS-DOS system would simply respond to the interrupt by transferring control, via its own interrupt vector table (IVT) 410, to the associated MS-DOS system interrupt handler in the MS-DOS kernel.

The mechanism that is, in fact, provided in computer 10 in accordance with a feature of the invention takes advantage of the fact that, in processors like the 80286, the IVT is addressed by adding an index associated with the interrupt in question to a base value stored in a particular base register, that value being the starting location of the IVT. As shown in FIG. 4, the MS-DOS system IVT is located at the head of the operating system. Thus a computer that would run the MS-DOS system exclusively would simply maintain the address 0 in the aforementioned IVT base register. In accordance with a feature of the present invention, however, a different address is loaded into that register within block 1004 of sw_to_dos routine 551, that address being the starting address of a "relocated" IVT 475 maintained within switch.sys area 43.

Figure 14:
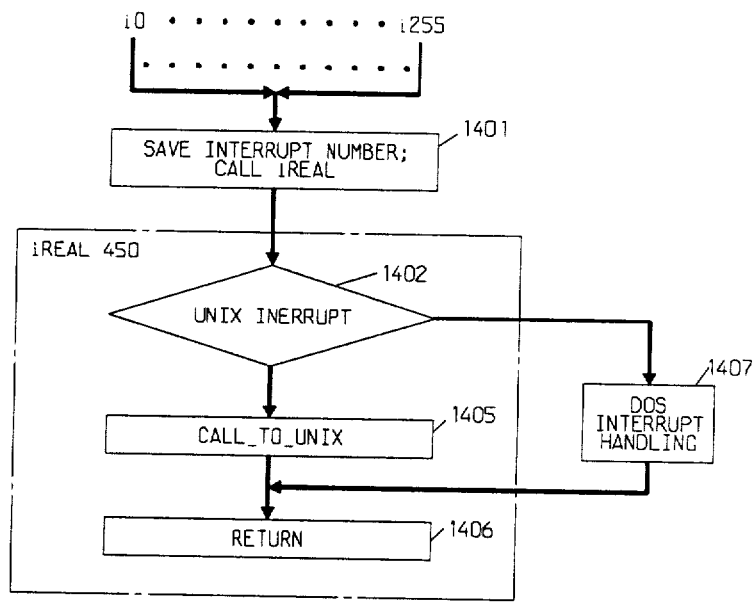

The IVT routines in the relocated IVT 475 are similar to those in the UNIX system interrupt descriptor table (IDT) as described above. Thus, as indicated at block 1401 of FIG. 14, which depicts how the computer deals with interrupts occurring during real mode execution, the IVT routines in the relocated IVT first store away information regarding the number of the interrupt that was issued. They then call a routine called ireal 450 within switch.sys area 43. As indicated at 1402, ireal 450 determines whether the interrupt is owned by the UNIX system. If it is not, ireal 450 causes control to pass through the true MS-DOS system IVT 410 to the appropriate MS-DOS system interrupt handler, as indicated at 1407. A return routine is then invoked, as indicated at block 1406, and execution resumes at the point at which the computer was interrupted.

If, on the other hand, the UNIX system does own the interrupt, the computer must be switched to protected mode so that the associated UNIX system interrupt handler can execute properly. To this end, ireal 450 proceeds to block 1405 where it calls the routine call_to_unix 463. The latter is similar to sw_to_unix routine 459 except that the information that it writes into data area 473 points not to ret_from_dos, but to a different routine in area 54, int_from_dos 546.

Figure 15:
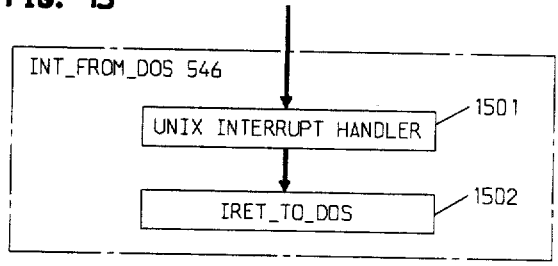

The routine int_from_dos, in turn, is shown in FIG. 15. That routine has essentially two functions. As indicated at 1501, it first passes control to the UNIX system interrupt handler associated with the interrupt in question. It then calls a routine iret_to_dos 553 in the UNIX system, as indicated at 1502, so as to return the computer to the real mode execution that was in progress when the interrupt went off. The routine iret_to_dos 553 is, for practical purposes, identical to sw_to_dos 551. Execution thus resumes at the very end of call_to_unix at block 1405 and immediately falls through, as before, to the return routine indicated at block 1406.

We are now in a position to discuss in further detail the context switching mechanism described earlier.

In accordance with a feature of the invention, ownership of the keyboard and video monitor go together. That is, whichever operating system owns one owns the other. This is desirable since at any particular point in time, the screen being displayed by the owner of the video monitor may be prompting the user for keyboard input. Since the context switching is initiated by a keyboard entry, the program code that implements it is to be embedded in an interrupt handler invoked in response to a keyboard interrupt and is, in fact, embedded in a special-purpose context switch interrupt handler in the UNIX system. Thus even though, in the normal course of events, a keyboard interrupt that occurs while the MS-DOS system owns that interrupt would ultimately be serviced by the MS-DOS system keyboard interrupt handler, a keyboard interrupt generated because the user has requested a context switch must be serviced in the UNIX system. To this end, when a keyboard interrupt occurs at a time when the MS-DOS system owns that interrupt, the corresponding routine called from relocated interrupt vector table 475 examines the keyboard's buffer. If that routine finds that a context switch has been requested, it immediately calls call_to_unix, rather than the MS-DOS system keyboard interrupt handler and, in that call, specifies a predetermined interrupt number uniquely associated with a context switch. A UNIX system context switch interrupt handler is thereby ultimately invoked.

FIG. 16 is a flowchart of a routine, swtchscr 541, that is called by the aforementioned interrupt handler when a context switch has been requested. This routine is also called from the aforementioned intr program when a context switch is requested while the UNIX system owns the keyboard interrupt. (If desired, a command could be provided for users to call this routine directly in order to effect a software-initiated context switch.) By way of example, it will be assumed that the UNIX system screen is the one currently being displayed.

In particular, as indicated at block 1601, swtchscr 541 first changes the keyboard ownership to indicate that the keyboard is now to be owned by the MS-DOS system. The aforementioned entries in the global descriptor table are then exchanged, as indicated at 1603, so that all screen data from the UNIX system will be sent to alternate screen buffer 565 rather than to screen buffer 44. The video monitor is then blanked, as indicated at 1606, by causing the video controller to turn off its output video signal. At block 1608, the keyboard state that last obtained when the MS-DOS system owned the keyboard is restored. That state includes, for example, the state of the CAPS LOCK key, the value of a user-programmable character repeat repetition rate, etc. The data in screen buffer 44 and alternate screen buffer 565 is then exchanged at block 1610, and the state of the video controller that last obtained when the MS-DOS system owned the monitor is restored at block 1611. That state includes, for example, information as to whether the monitor was in graphics mode or character mode, the number of displayed rows and columns, etc. The video controller output signal is then turned back on, as indicated at 1612.

The context switching is at this point complete, and the interrupt handler that called swtchscr 541 returns.

FIG. 17 depicts that portion of NMI service routine 471 that is executed when an I/O trap NMI occurs. For the purposes of decision box 1402 within the routine ireal, the NMI may be regarded as being owned by the MS-DOS system. The routine thus executes in real mode.

As indicated at 1701, the NMI service routine first determines from bits set in latch 151, as previously described, whether the NMI resulted from an I/O trap, as opposed, for example, to a parity check or other hardware error. If it did not result from an I/O trap, the routine proceeds to service the interrupt in the usual way. If the NMI did result from an I/O trap, on the other hand, the routine proceeds to block 1704 where it retrieves the information trapped in FIFO registers 184, 185 and 186 as also described above.

Before proceeding, it is necessary at this point to introduce the notion of shared devices.

In particular, certain of the devices in computer 10—including, for example, the keyboard, video controller and interrupt controller—cannot be unchangeably allocated to one operating system or the other. Thus, as previously noted, they are regarded as being shared. In the case of the keyboard and video controller, for example, ownership of these devices passes back and forth during context switches. As seen previously, when the computer is switched from displaying one of the UNIX system and MS-DOS system screens to the other, the keyboard and video controller must be restored to the states that obtained when that other screen was last displayed. Thus before a context switch is made, the current state of the keyboard and video controller must be saved. In the present embodiment, however, neither the keyboard nor the video controller provide a mechanism to allow their states to be read. As will be described momentarily, this situation is dealt with by virtualizing each shared device by maintaining a software record of its current state and updating that record whenever the state is changed.

In the case of the interrupt controller, it will be remembered that that device must respond to hardware interrupts owned by both operating systems. Here, the issue is not only one of needing to virtualize the device to keep track of its state, but also one of protection. For example, a mechanism must be provided to allow each operating system to mask its own interrupts, while not affecting the interrupts owned by the other.

On the UNIX system side, the above functionality is carried out by the routine that is called to open devices. That routine both records whatever changes it may make to the state of the corresponding physical device and also ensures that such changes are consistent with any existing use of the device by the MS-DOS system.

On the MS-DOS system side, this functionality is carried out by the NMI routine currently under discussion. Returning, then, to block 1706 of FIG. 17, the NMI routine now calls a routine specific to the device that the MS-DOS system attempted to access. If the device was a shared device—attempted accesses to shared devices being always trapped—the device-specific routine virtualizes the device by updating the aforementioned software record. If the device was not a shared device, the device specific routine determines whether the device is currently assigned to the UNIX system and, if it is not, takes steps to have it assigned to the MS-DOS system, that procedure being referring to as "auto-assignment." Moreover, for both shared and non-shared devices, the device-specific routine determines whether the attempted access is to be reissued, either as generated, or in a modified form. If, for example, the device was previously unassigned, the I/O operation, or access, can generally be reissued as is. If the device was previously assigned to the UNIX system, the attempted access is, in general, not reissued. If the device is shared but currently being used by the MS-DOS system, the access may be reissued as is, as in the case where the keyboard or video controller state is being changed, or may be issued in modified form. As an example of the latter, the MS-DOS system might have attempted to cause the interrupt controller to mask all interrupts. The modified I/O operation would be to cause the interrupt controller to mask all interrupts owned by the MS-DOS system.

If, as determined at block 1711, the device was auto-assigned at block 1706, the appropriate entries for I/O RAM 181 must be re-computed, as indicated at 1712. Then, if it was determined at block 1706 that the attempted I/O operation was to be reissued in some form, it is, in fact, reissued at this time, as indicated by blocks 1715 and 1718.

Because of possible time delays between the generation of the NMI signal at the output of gate 163, on the one hand, and the actual interrupting of processing, on the other hand, more than one instruction may have been trapped in FIFO registers 184–186. If, as determined at block 1719, there is more trapped information therein, the NMI service routine loops back to block 1704 to process it. Once all the trapped information has been processed, the routine falls through to block 1721 at which status register 186 is set to indicate that registers 184 and 185 are empty. (In addition, the bits in latch 151 associated with the TRAP lead and the NMI are reset via hardware leads not shown.)

Finally, the NMI routine proceeds to deal with the following situation: Suppose that the application in question issues an OUT (write) instruction to a port followed by a dependent IN (read) instruction. The OUT instruction might be, for example, to turn on the floppy disk motor and the IN instruction might be to read whether the motor has, in fact, turned on. If the floppy disk unit was not assigned to the MS-DOS system at the time, the OUT instruction will have been trapped. But if the IN instruction occured before servicing of the NMI was initiated, then when the current real mode state is saved on the OS merge stack 468 going into the NMI service routine, the state of register AX in processor 11, in which the results of IN instructions are always placed, will show that the motor is off. Since the floppy disk will have been autoassigned to the MS-DOS system, however, the OUT instruction will have been re-issued and the floppy motor will be on. Were nothing else done, then, the MS-DOS application will be restored to a state in which the contents of the AX register incorrectly reflect the motor state. In such situations, as indicated at blocks 1722 and 1725, the contents of the AX register that were stored on the OS merge stack are changed to reflect what they should be as determined by reissuing the IN instruction. The NMI routine then returns at block 1727.

The foregoing merely illustrates the principles of the present invention. Those skilled in the art will be able to devise numerous arrangements which, although not explicitly shown or described herein, embody those principles and are thus within the spirit and scope of the invention.

What is claimed is:

1. A digital computer capable of concurrently executing at least first and second programs, said computer comprising a processor having a protected mode of operation and a non-protected mode of operation, means for causing said first and second programs to be executed in said protected and non-protected modes of said processor, respectively, and means operative prior to at least the initiation of the execution of said second program for identifying individual addressable entities in said computer to which access by said second program is to be inhibited and operative when said second program is executing for inhibiting access to said individual entities.

2. A computer of the type in which a selected one of a plurality of addressable entities connected to an address bus is accessed during a bus cycle by generating on said address bus an address associated with said addressable entity and thereafter generating a control pulse on a control lead and extending it to said selected entity, said computer comprising a processor having a protected mode of operation and a non-protected mode of operation, means operative when said processor is operating in said protected mode for identifying at least an individual one of said addressable entities to which access by code executing in said non-protected mode is to be limited, and means operative when said processor is in said non-protected mode and in response to the generation on said address bus during a particular bus cycle of the address associated with said individual one of said addressable entities for inhibiting the control pulse subsequently generated on said control lead during said bus cycle.

3. A computer comprising a bus, a processor connected to said bus having a protected mode of operation and a non-protected mode of operation, said processor issuing on said bus instructions each identifying an entity connected to said bus to be accessed in a specified manner, means operative when said processor is operating in said protected mode for identifying individual ones of said entities to which access is to be inhibited when said processor is thereafter operating in said non-protected mode, and means operative when said processor is thereafter operating in said non-protected mode for precluding the completion of the execution of instructions identifying said individual ones of said entities.

4. The invention of claim 3 further comprising means connected to said bus for trapping at least said instructions identifying said individual ones of said entities and means for selectively re-issuing onto said bus ones of said trapped instructions.

* * * * *